US007599148B2

(12) United States Patent
Chan et al.

(10) Patent No.: US 7,599,148 B2
(45) Date of Patent: Oct. 6, 2009

(54) APPARATUS AND METHOD FOR INTEGRAL FILTER AND BYPASS CHANNEL IN A HARD DISK DRIVE

(75) Inventors: Andre S. Chan, Milpitas, CA (US); Theresa S. Chu, Milpitas, CA (US); Ferdinand Hendriks, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 387 days.

(21) Appl. No.: 11/544,788

(22) Filed: Oct. 5, 2006

(65) Prior Publication Data

US 2008/0084631 A1 Apr. 10, 2008

(51) Int. Cl.
*G11B 33/14* (2006.01)
(52) U.S. Cl. .................................. 360/97.02; 360/97.03
(58) Field of Classification Search .............. 360/97.02, 360/97.03, 97.01, 97.04, 98.01
See application file for complete search history.

(56) References Cited

U.S. PATENT DOCUMENTS

| 5,031,059 A | * | 7/1991 | Yamaguchi et al. ...... 360/97.03 |
| 6,008,965 A | | 12/1999 | Izumi et al. |
| 6,560,066 B2 | | 5/2003 | Imai et al. |
| 6,898,048 B2 | * | 5/2005 | Adams et al. ............. 360/97.02 |
| 6,930,856 B2 | * | 8/2005 | Wang et al. .............. 360/97.02 |
| 7,382,572 B1 | * | 6/2008 | Turner et al. ............. 360/97.02 |
| 2002/0071203 A1 | | 6/2002 | Nakamoto et al. |
| 2002/0089781 A1 | * | 7/2002 | Tuma ....................... 360/97.02 |
| 2003/0202276 A1 | * | 10/2003 | Smith ...................... 360/97.02 |
| 2003/0210492 A1 | * | 11/2003 | Adams et al. ............ 360/97.02 |
| 2004/0141254 A1 | * | 7/2004 | Imai et al. ................ 360/97.02 |
| 2005/0041329 A1 | * | 2/2005 | Chan et al. ............... 360/97.02 |
| 2005/0041332 A1 | * | 2/2005 | Chan et al. ............... 360/97.02 |
| 2007/0188914 A1 | * | 8/2007 | Gross ....................... 360/97.02 |
| 2008/0013206 A1 | * | 1/2008 | Feliss et al. .............. 360/97.02 |
| 2008/0112074 A1 | * | 5/2008 | Yao et al. ................. 360/97.02 |

\* cited by examiner

*Primary Examiner*—Jefferson Evans

(57) ABSTRACT

Embodiments of the present invention are directed to an apparatus and method for guiding bypass reentry flow through filter integrated in a bypass channel sidewall in a hard disk drive. The method provides a bypass channel for directing airflow away from a first portion of a disk of the hard disk drive and toward a second portion of the disk of the hard disk drive, the bypass channel comprising an inner bypass channel sidewall and an outer bypass channel sidewall. The method further provides a first filter portion integral with the inner bypass channel sidewall, the filter portion for filtering a first portion of the airflow directed toward a third portion of the disk of the hard disk drive wherein a second portion of said airflow is directed toward the second portion of said disk drive.

17 Claims, 5 Drawing Sheets

500

Providing a bypass channel for directing airflow away from a first portion of a disk of the hard disk drive and toward a second portion of the disk of the hard disk drive, the bypass channel comprising an inner bypass channel sidewall and an outer bypass channel sidewall.
502

Providing a first filter portion integral with the inner bypass channel sidewall, the filter portion for filtering a first portion of the airflow directed toward a third portion of the disk of the hard disk drive wherein a second portion of the airflow is directed toward the second portion of the disk drive.
504

FIG. 5

APPARATUS AND METHOD FOR INTEGRAL FILTER AND BYPASS CHANNEL IN A HARD DISK DRIVE

TECHNICAL FIELD

The present invention relates to the field of hard disk drives, and more particularly to an apparatus and method for guiding bypass reentry flow through a filter integrated with a bypass channel sidewall in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPMs) can be achieved. For example, it is not uncommon for a hard disk drive to reach speeds of 15,000 RPMs. This second refinement provides weight and size reductions to the hard disk drive, it also provides a faster read and write rate for the disk thereby providing increased speed for accessing data. The increase in data acquisition speed due to the increased RPMs of the disk drive and the more efficient read/write head portion provide modern computers with hard disk speed and storage capabilities that are continually increasing.

However, the higher RPMs of the disk has resulted in problems with respect to the interaction of the air with components of the hard disk drive. For example, although the hard disk drive is closed off from the outside, it has an amount of air within its packaging. As the disk spins and the RPMs increase, the air within the hard disk drive package will also begin to rotate and will eventually approach the speed at which the disk is rotating especially near the spindle hub and disk surfaces. This is due to the friction between the disk and the air. In general, Reynolds numbers are used to represent the flow characteristics. For example, in one case the Reynolds number may be based on the tip speed of the disk. That is, the linear velocity at the outer diameter of the disk.

Only when the Reynolds number is sufficiently small (e.g., an enclosure with reduced air density), the air may stay in laminar flow with the boundary layer of air remaining smooth with respect to the rotating disk. However, any obstructions to the flow will result in turbulence. That is, due to the introduction of obstructions to the airflow, the airflow will become turbulent as it passes the obstruction.

As is well known from fluid mechanics, the characteristics of turbulent airflow can include buffeting, harmonic vibration, and the like. Each of these characteristics will result in problematic motion for the arm and head portion and/or the rotating disk. The problematic motion will result in excessive track misregistration. This is even more significant as the tolerances are further reduced.

A second problem also occurs due to the increasingly tighter tolerances of the hard disk drive. For example, particle matter in the air can be detrimental to the operation of the hard disk drive. That is, since the head portion of the hard disk drive is located so close to the disk, even the slightest particle in the air can cause the head portion to destructively interact with the track it is reading from or writing to. Therefore, a filter is necessary to remove the detrimental particles from the airflow.

One solution to the airflow problem has been the replacement of the air within the hard disk drive package. In some cases, the air is replaced with gases such as Helium that significantly lower the Reynolds number of the drive. A second solution has been the partial removal of the air within the hard disk drive package. Both solutions require significant structural and material changes with respect to the shell of the hard disk drive package. Additionally, the costs associated with the structural and material changes and the manufacturing requirements are extremely prohibitive.

SUMMARY OF THE INVENTION

An apparatus and method for guiding bypass reentry flow through filter integrated in a bypass channel sidewall in a hard disk drive is disclosed. The method provides a bypass channel for directing airflow away from a first portion of a disk of the hard disk drive and toward a second portion of the disk of the hard disk drive, the bypass channel comprising an inner bypass channel sidewall and an outer bypass channel sidewall. The method further provides a first filter portion integral with the inner bypass channel sidewall, the filter portion for filtering a first portion of the airflow directed toward a third portion of the disk of the hard disk drive wherein a second portion of said airflow is directed toward the second portion of said disk drive.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 5 is a flowchart of an exemplary method for guiding bypass reentry flow through a filter integrated into a bypass channel wall in a hard disk drive in accordance with an embodiment of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Embodiments of the present invention include an apparatus and method for guiding bypass reentry flow through filter integrated in a bypass channel sidewall in a hard disk drive. The present invention includes many advantages, including improved airflow characteristics in a disk drive. In addition, embodiments of the present invention provide improved particle filtration inside a disk drive. Another advantage of the present invention is that it does not introduce disruptions in the disk shroud which could potentially negatively affect airflow characteristics inside the disk drive. The present invention provides a filter integral with the bypass channel sidewall in a disk drive.

Figure 1:
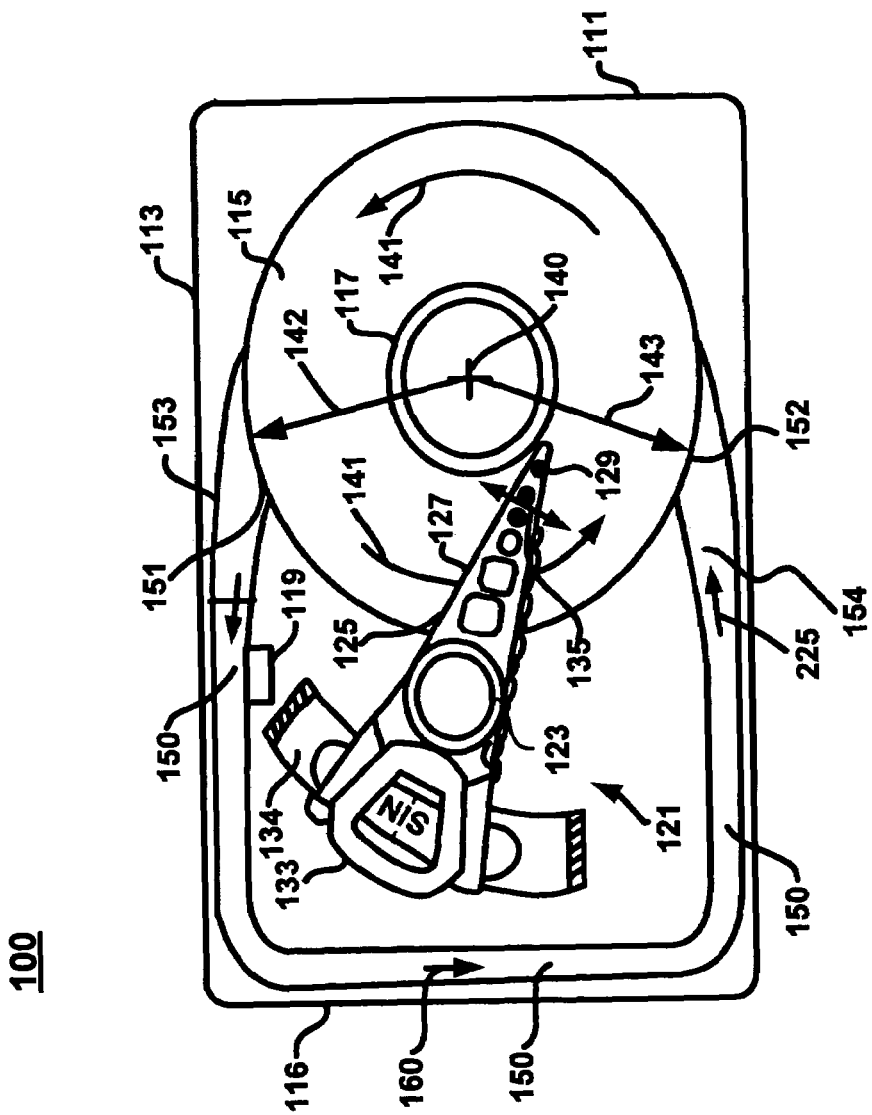
FIG. 1 shows an exemplary information storage system in accordance with an embodiment of the present invention.

With reference now to FIG. 1, a schematic drawing of one embodiment of an information storage system 100 comprising a magnetic hard disk file or drive 111 for a computer system is shown. Drive 111 has an outer housing or base 113 containing a disk pack having at least one media or magnetic disk 115. The disk or disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is head and the slider 129, which are mounted on suspension 127. The slider 129 is usually bonded to the end of suspension 127. The head is typically pico size (approximately 1160× 1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring still to FIG. 1, the disk pack and disks 115 (one shown) define an axis 140 of rotation 141 and radial directions 142, 143, relative to the axis 140. The drive 111 also has a bypass channel 150 formed in the housing 113 for directing the airflow 160 generated by rotation of the disks 115 from the upstream side of the disk pack or disks (e.g., proximate to radial direction 142 in FIG. 1) 115 to the downstream side of the disk pack or disks 115 (e.g., proximate to radial direction 143 in FIG. 1).

In the embodiment shown, the bypass channel 150 is located between an outer perimeter 116 (FIG. 1) of the housing 113 and the actuator 121, such that the bypass channel 150 completely circumscribes the actuator 121. Bypass channel 150 further comprises a first opening 151 proximate to upstream side wherein air is conveyed away from the disks 115 and a second opening 152 proximate to downstream side wherein airflow 160 is directed toward the disks 115.

As shown in FIG. 1, one embodiment of the drive 111 bypass channel 150 constructed in accordance with the present invention also comprises a diffuser 153. In the embodiment shown, the diffuser 153 is located in the bypass channel 150 and is positioned adjacent to the upstream side of the disk pack or disks 115. The diffuser 153 is also offset upstream from the disks 115 in the radial direction 142, such that the diffuser 153 reduces airflow drag from the disks 115 due to disk wake in the bypass channel 150. This type of aerodynamic drag is commonly called base drag. In embodiments of the present invention, bypass channel 150 exhibits low flow resistance to airflow 160.

Alternatively, or operating in conjunction with the diffuser 153, another embodiment of the drive 111 may include a contraction 154 (e.g., a Venturi). The contraction 154 is also located in the bypass channel 150, but is adjacent to the downstream side of the disk pack or disks 115. Like the diffuser 153, the contraction 154 is typically offset downstream from the disks 115, but in a radial direction 143. Each of the diffuser 153 and the contraction 154 may be spaced apart from the outer edges of the disks 115 in radial directions 142, 143 by, for example, approximately 0.5 mm. The contraction 154 may be provided for re-accelerating bypass airflow 160 to provide efficient energy conversion for the air flow from pressure energy to kinetic energy prior to merging bypass airflow 160 with air flow 141 around the disks 115.

The use of bypass channel 150 has several advantages, including the ability to reduce aerodynamic buffeting of actuator 121 during the servo writing process and/or during normal operation of disk drive system 111. More specifically, bypass channel 150 reduces the pressure build-up on the upstream side of actuator 121 which occurs when drive 111 is operated. Additionally, directing airflow 160 around the actuator 121 decreases the upstream pressure on the actuator, thus reducing force acting on the actuator 121 while reducing the energy of the bluff-body wake of the actuator arm.

Because embodiments of the present invention reduce aerodynamic buffeting of actuator 121 while providing filtration, a more idealized (e.g., round) servo track can be written to disk 115. This in turn facilitates reducing the pitch between servo tracks on the disk and increasing area density for the data storage device.

In embodiments of the present invention, disk drive system 111 may be filled with a gas (e.g., helium) rather than ambient air. This may be advantageous in that helium is a lighter gas than ambient air and causes less buffeting of actuator 121 when disk drive system 111 is in operation. In embodiments of the present invention, disk drive 111 may be sealed after the servo writing process to keep the helium in the drive. Alternatively, the helium may be removed from disk drive 111 and ambient air is allowed to return into the disk drive prior to sealing first opening 151 and second opening 152.

Figure 2:
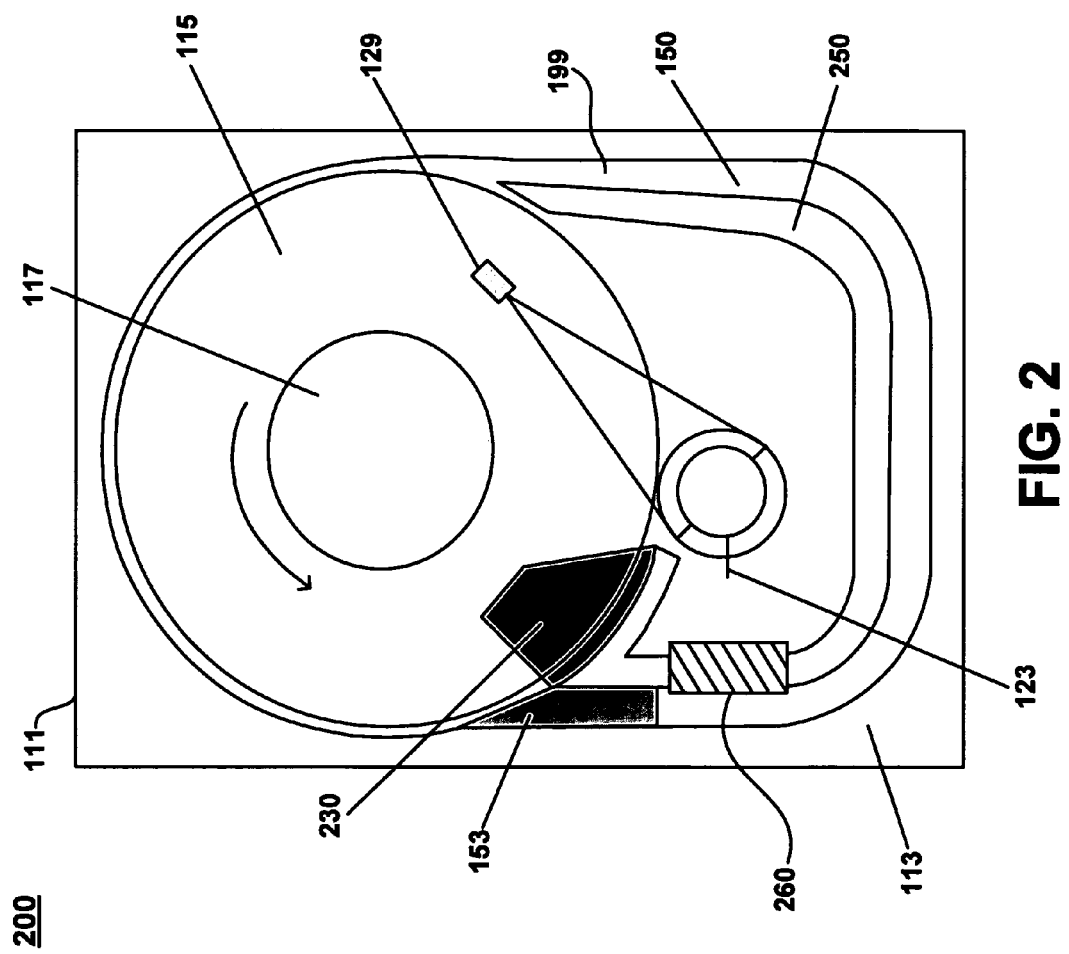
FIG. 2 shows an exemplary information storage system comprising an integrated filter and bypass channel with the filter located close to the entrance of the bypass channel in accordance with an embodiment of the present invention.

FIG. 2 shows an exemplary information storage system 200 comprising an integrated filter 260 and bypass channel 150 with the filter 260 located close to the entrance of the bypass channel 150 in accordance with an embodiment of the present invention. In one embodiment of the invention, the drive 111 also comprises a diffuser 153. In the embodiment shown, the diffuser 153 is located in the bypass channel 150 and is positioned adjacent to the downstream side of the disk pack or disks 115. The diffuser 153 is also offset downstream from the disks 115 in the radial direction, such that the diffuser 153 reduces airflow drag from the disks 115 due to disk wake in the bypass channel 150. This type of aerodynamic drag is commonly called base drag.

Alternatively, or operating in conjunction with the diffuser 153, another embodiment of the drive 111 may include a contraction portion 199 (e.g., a Venturi). The contraction portion is also located in the bypass channel 150, but is adjacent to the upstream side of the disk pack or disks 115. Like the diffuser 153, the contraction can be offset upstream from the disks 115, but in a radial direction. The contraction 199 is provided for re-accelerating a slow bypass air flow from the contraction to the disks 115 to provide efficient energy conversion for the air flow from pressure energy to kinetic energy prior to merging the slow bypass air flow with air flow around the disks 115.

High pressure results in the bypass channel 150 when air flow is directed away from the disk 115. Embodiments of the present invention take advantage of the difference in pressure between the bypass channel (e.g., higher pressure) and the disk drive casing 113 (e.g., lower pressure) to filter the airflow. The filter 260 is integrated into the bypass channel 115 and the higher pressure in the bypass channel directs a first portion of airflow through the filter 260 and towards the disk 115. In most cases, the pressure differential between the bypass channel 150 and the disk 115 is greatest closest to the entrance of the bypass channel 150. In one embodiment of the invention, the filter is located closer to the entrance of the bypass channel 150 than the exit of the bypass channel 150 to take advantage of the greater pressure differential. In FIG. 2, the integral bypass/filter is located close to the diffuser 153 at the entrance of the bypass channel 150.

One advantage of the present invention is that airflow is effectively directed into the bypass channel 150 without additional interruptions of a disk shroud (not shown), which could compromise airflow characteristics. A shroud is a wall, typically built in to the base casting 113 that is adjacent to the disk 115 outer diameter. A shroud gap to disk outer diameter is typically minimized for good aerodynamic purpose.

In one embodiment of the invention, the diverter 230 may comprise wings that extend into the disk spacing. In one embodiment of the invention, the diverter 230 improves filtration because it causes a higher flow rate in the bypass channel 150. It is appreciated that the present invention can function without the existence of diverter wings.

Another advantage of the present invention is that fewer components are needed to assemble the disk drive 111, since the filter 260 is integral with the bypass channel wall 250, and since the diverter 230 can be integrated with the diffuser 153.

In one embodiment, the integrated filter 260 and bypass 150 is manufactured from a single piece. For example, the structure may be molded, injected, formed, fabricated and/or milled. Additionally, the structure may be metal, plastic and/or composite. It is appreciated that the structure is a single piece which includes both a bypass channel 150 and a filter portion 260. In one embodiment of the invention, the filter comprises micro-pores in the bypass channel sidewall 250. For example, holes could be drilled in any number of ways through the bypass channel wall 250 to create the filter 260. In another embodiment of the invention, the filter 260 is made of a different material than the bypass channel sidewall 250 material.

Figure 3:
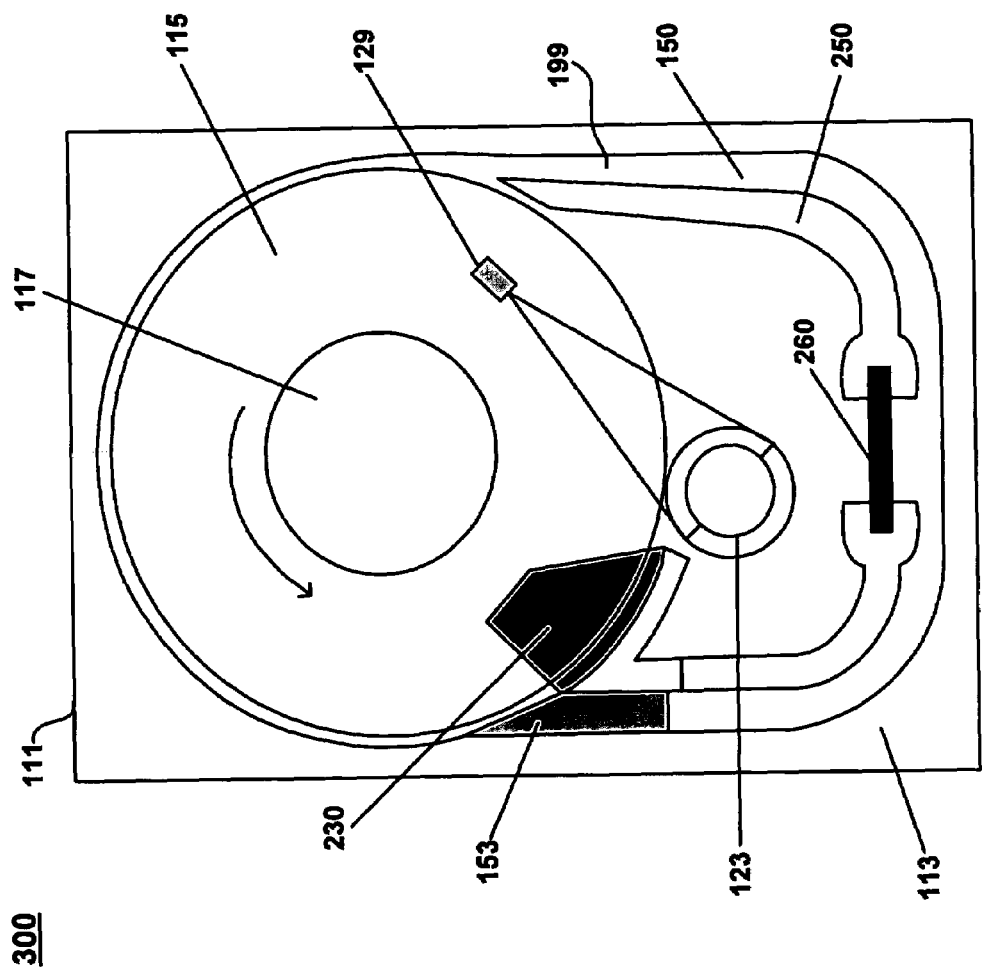
FIG. 3 shows an exemplary information storage system comprising an integrated filter and bypass channel with the filter further downstream in accordance with an embodiment of the present invention.

FIG. 3 shows an exemplary information storage system 300 comprising an integrated filter 260 and bypass channel 150 with the filter 260 further downstream in accordance with an embodiment of the present invention. In some cases, the location of the filter 260 must be downstream from the location illustrated in FIG. 2 (e.g., close to the diffuser 153) because file components of the disk drive 111 (e.g., actuator pivot 123) are in the way, obstructing airflow. In this situation, the filter 360 is located further downstream as shown in FIG. 3. In one embodiment of the invention, the filter area is adjusted according to the location of the filter 260.

Figure 4:
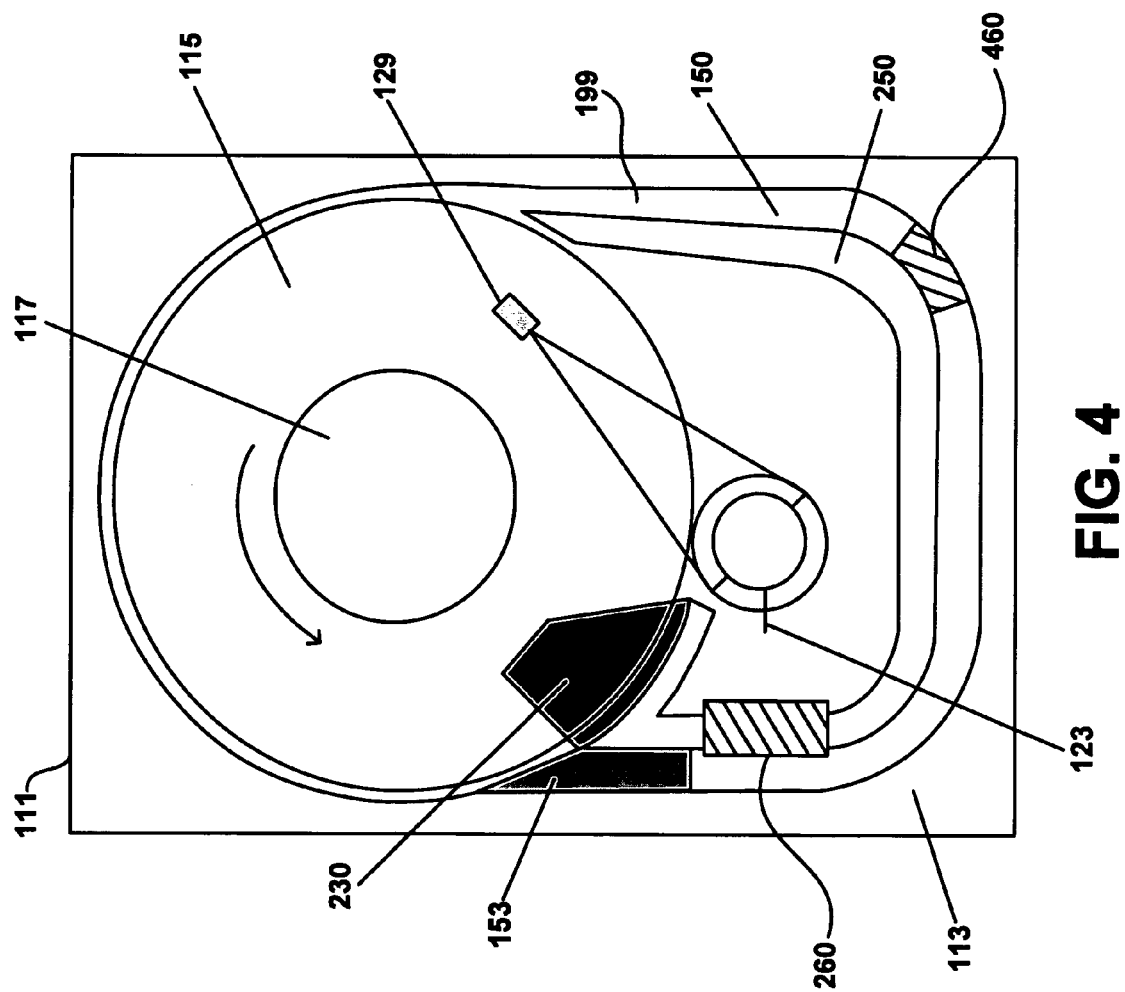
FIG. 4 shows an exemplary information storage system comprising an integrated filter and bypass channel and comprising an in-line filter in accordance with an embodiment of the present invention.

FIG. 4 shows an exemplary information storage system 111 comprising an integrated filter 260 and bypass channel 150 and comprising an in-line filter 460 in accordance with an embodiment of the present invention. In one embodiment of the invention, an in-line filter 460 is located downstream from the integrated filter 260 and bypass channel 150. In one embodiment of the invention, the integrated filter 260 is a particulate filter and the in-line filter 460 is a chemical filter.

FIG. 5 is a flowchart of an exemplary method 500 for guiding bypass reentry flow through a filter integrated into a bypass channel wall in a hard disk drive in accordance with an embodiment of the present invention.

At step 502, method 500 includes providing a bypass channel for directing airflow away from a first portion of a disk of the hard disk drive and toward a second portion of the disk of the hard disk drive, the bypass channel comprising an inner bypass channel sidewall and an outer bypass channel sidewall.

At step 504, method 500 includes providing a first filter portion integral with the inner bypass channel sidewall, the filter portion for filtering a first portion of the airflow directed toward a third portion of the disk of the hard disk drive wherein a second portion of the airflow is directed toward the second portion of the disk drive. In one embodiment of the invention, micro-pores in the inner bypass channel sidewall constitute the first filter portion. In one embodiment of the invention, the first filter portion is a particulate filter. In another embodiment of the invention, the first filter portion is a different material from the material of the bypass channel sidewalls.

In one embodiment of the invention, the second portion of the airflow passing through the bypass channel does not pass through the first filter portion integral with the inner bypass channel sidewall because the airflow continues through the length of the bypass channel and exits said bypass channel.

In one embodiment of the invention, the first filter portion (e.g., the integrated bypass channel wall and filter) are located closer to the entrance of the bypass channel than the exit of said bypass channel to take advantage of the greater pressure differential near the entrance of the bypass channel.

In some cases, a second filter portion in-line with the bypass channel and after the first filter portion is used to filter chemicals in the airflow. In this embodiment, the first filter portion is a particulate filter.

The preferred embodiment of the present invention, a bypass channel for a disk drive, is thus described. While the present invention has been described in particular embodiments, it should be appreciated that the present invention should not be construed as limited by such embodiments, but rather construed according to the following claims.

What is claimed is:

1. A method for guiding bypass reentry flow through a filter integrated into a bypass channel wall in a hard disk drive comprising:
   providing a bypass channel for directing airflow away from a first portion of a disk of the hard disk drive and toward a second portion of the disk of the hard disk drive, said bypass channel comprising an inner bypass channel sidewall and an outer bypass channel sidewall;
   providing a first filter portion integral with said inner bypass channel sidewall, said filter portion for filtering a first portion of said airflow directed toward a third portion of the disk of the hard disk drive wherein a second portion of said airflow is directed toward said second portion of said disk drive; and
   providing a second filter portion in-line with said bypass channel, said second filter portion provided after said first filter portion with respect to said airflow wherein a contraction portion is located closer to the second portion of the disk of the hard disk drive than the filter portion.

2. The method as recited in claim 1 wherein said second portion of said airflow passing through said bypass channel does not pass through the first filter portion integral with said inner bypass channel sidewall.

3. The method as recited in claim 1 wherein the first portion of the airflow passing through the first filter portion exits said bypass channel.

4. The method as recited in claim 1 wherein said providing a filter portion further comprises:
   providing said filter closer to the entrance of said bypass channel than the exit of said bypass channel.

5. The method as recited in claim 1 wherein the first portion of the airflow passing through the contraction portion provides a suction such that the second portion of the airflow is drawn through the filter portion.

6. A bypass channel for directing airflow to a disk of a hard disk drive comprising:
   an outer bypass channel sidewall;
   an inner bypass channel sidewall, the inner bypass channel sidewall closer to said disk with respect to said outer sidewall; and
   a first filter portion integral with the inner sidewall, said first filter portion for filtering a first portion of the airflow to the disk of the hard disk drive wherein the first portion of the airflow passing through the contraction portion provides a suction such that the second portion of the airflow is drawn through the filter portion.

7. The bypass channel of claim 6 wherein a second portion of the airflow passing through the bypass channel does not pass through the first filter portion.

8. The bypass channel of claim 6 wherein the first portion of the airflow passing through the first filter portion does not pass through the bypass channel after the first filter portion.

9. The bypass channel of claim 6 wherein the bypass channel further comprises:
   a second filter portion inline with said bypass channel and after said first filter portion with respect to said airflow.

10. The bypass channel of claim 6 wherein said second filter portion filters chemicals from said airflow.

11. The bypass channel of claim 6 wherein the airflow comprises an inert gas.

12. A hard disk drive comprising:
    a housing;
    a disk pack mounted to the housing and having a plurality of disks that are rotatable relative to the housing, the disk pack defining an axis of rotation and a radial direction relative to the axis, and the disk pack having a downstream side wherein air flows away from the disks, and an upstream side wherein air flows toward the disk;
    an actuator mounted to the housing and being movable relative to the disk pack, the actuator having a plurality of heads for reading data from and writing data to the disks; and
    a bypass channel formed in the housing for directing the air flows generated by rotation of the disks from the downstream side of the disk pack to the upstream side of the disk pack, said bypass channel comprising a first filter portion integral with a sidewall of said bypass channel, said filter portion for filtering a first portion of the air flow to the upstream side of the disk pack,
    wherein the first filter portion further comprises micro pores distributed over a portion of the bypass channel sidewall.

13. The hard disk drive of claim 12 wherein a second portion of the airflow passing through the bypass channel does not pass through the first filter portion.

14. The hard disk drive of claim 12 wherein the first portion of the airflow passing through the first filter portion does not pass through a contraction portion of the bypass channel.

15. The hard disk drive of claim 12 wherein the first filter portion is located closer to the entrance of the bypass channel; than the exit of the bypass channel.

16. The hard disk drive of claim 12 wherein a contraction portion is located closer to the disk of the hard disk drive than the first filter portion.

17. The hard disk drive of claim 12 further comprising a second filter portion located inline with said bypass channel wherein the second filter portion is located after the first filter portion with respect to the air flow.

* * * * *